US010114937B2

(12) United States Patent
Bassenye-Mukasa et al.

(10) Patent No.: US 10,114,937 B2
(45) Date of Patent: Oct. 30, 2018

(54) CONTINUOUS BIOMETRIC AUTHENTICATION SYSTEM AND METHOD FOR MAN-MACHINE USER INTERFACES

(71) Applicants: Charles Bassenye-Mukasa, Tinton Falls, NJ (US); Anne Quigg, Manalapan, NJ (US)

(72) Inventors: Charles Bassenye-Mukasa, Tinton Falls, NJ (US); Anne Quigg, Manalapan, NJ (US)

(*) Notice: Subject to any disclaimer, the term of this patent is extended or adjusted under 35 U.S.C. 154(b) by 131 days.

(21) Appl. No.: 15/438,708

(22) Filed: Feb. 21, 2017

(65) Prior Publication Data
US 2017/0242995 A1    Aug. 24, 2017

Related U.S. Application Data

(60) Provisional application No. 62/297,907, filed on Feb. 21, 2016.

(51) Int. Cl.
*H04L 29/06* (2006.01)
*G06F 21/32* (2013.01)
*G06F 17/30* (2006.01)

(52) U.S. Cl.
CPC ........ *G06F 21/32* (2013.01); *G06F 17/30528* (2013.01)

(58) Field of Classification Search
None
See application file for complete search history.

(56) References Cited

U.S. PATENT DOCUMENTS

| 6,498,861 | B1* | 12/2002 | Hamid | G06K 9/00087 |
| | | | | 340/5.52 |
| 7,212,613 | B2 | 5/2007 | Kim et al. | |
| 2005/0071635 | A1* | 3/2005 | Furuyama | G06F 21/32 |
| | | | | 713/168 |
| 2007/0206838 | A1* | 9/2007 | Fouquet | G06F 21/32 |
| | | | | 382/115 |
| 2014/0316984 | A1* | 10/2014 | Schwartz | G06Q 20/4016 |
| | | | | 705/44 |
| 2015/0113634 | A1 | 4/2015 | Mau | |
| 2017/0099278 | A1* | 4/2017 | Ducatel | G06F 21/31 |

FOREIGN PATENT DOCUMENTS

| EP | 0735502 A2 | 10/1996 |
| JP | 5710748 B2 | 4/2014 |
| JP | 5605854 B2 | 10/2014 |

* cited by examiner

*Primary Examiner* — Shin-Hon (Eric) Chen
(74) *Attorney, Agent, or Firm* — Christopher Pilling

(57) ABSTRACT

A method for providing user identity verification comprising steps: (a) reading a plurality of biometric attributes from a user continuously and simultaneously from one or more time-synchronized biometric scanners, wherein the plurality of biometric attributes includes a plurality of attribute samples from a plurality of scanner channels; (b) selecting one of the plurality of attribute samples from a channel of the plurality of scanner channels based on rules from a policy database; (c) generating a digital profile that can uniquely identity the user from the one of the plurality of attribute samples; (d) comparing the digital profile to a reference profile in a biometric database, wherein the biometric database was generated during a prior registration process; and (e) generating a probability value that the digital profile and the reference profile belong to the same user.

9 Claims, 7 Drawing Sheets

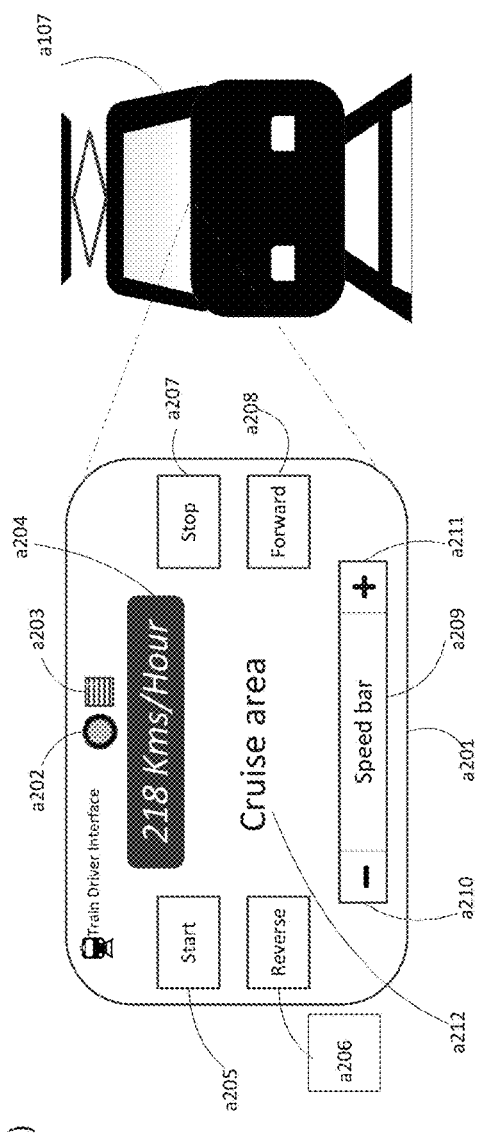
FIG 2(a)
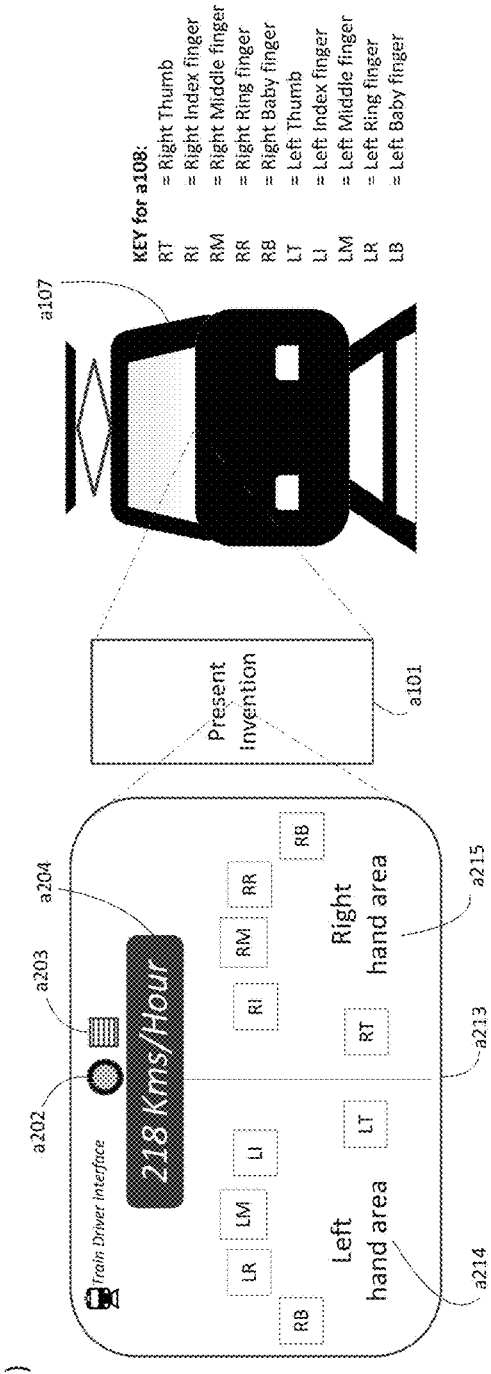
FIG 2(b)
FIG 2

CONTINUOUS BIOMETRIC AUTHENTICATION SYSTEM AND METHOD FOR MAN-MACHINE USER INTERFACES

CROSS-REFERENCE TO RELATED APPLICATIONS

The present application claims priority to U.S. Provisional Patent Application Ser. No. 62/297,907, filed on Feb. 21, 2016, titled "Distributed Biometric Authentication Input Interface", the disclosure of which is hereby incorporated in its entirety at least by reference.

BACKGROUND OF THE INVENTION

Field of the Invention

The present invention is in the technical field of authentication of users for access to computerized system resources. More specifically, the present invention relates to application of statistical smoothing to continuous biometric user authentication, for more reliable, stable, secure and functional operator interfaces in human operated commercial, military and other products.

Description of Related Art

Technological advances over the past few decades have made it possible to design man-machine user interfaces for human operated systems that continuously verify user identity for resource access purposes by periodically sampling from a stream of one of his biometric characteristics, such as fingerprint or voiceprints readings. Systems that simultaneously process multiple biometric data streams, to minimize the risk of erroneous user authentication have also been described.

Continuous biometric authentication that relies on reading multiple simultaneous streams of user biometric attributes creates opportunities for highly functional, secure and reliable man-machine user interfaces in new classes of high-value, human operated commercial, military and other products. Examples would include battle-field weapon systems, command and control, proof of identity, proof of life, presence verification, motor vehicle control, and the like.

However, because traditional user authentication is fundamentally a binary decision and failure to authenticate normally results into immediate denial of access, it is unsuitable for adoption to systems that require high levels of operational stability and must tolerate statistical errors in biometric data readings.

Consequently, there is a need for a man-machine interface system design and method for continuous multiple data stream biometric authentication which responds gracefully to intermittent binary authentication failures and can utilize context information on the body part that produced the data, such that: (a) stable system normal operation can be maintained in the face of occasional false positive and false negative authentication results; (b) system operation start-up and stoppage is free of erratic behavior; (c) smooth continuity of operation is possible during handover from one authorized operator to another; and (d) user intent can be determined based on the context information about the biometric data source.

BRIEF SUMMARY OF THE INVENTION

In one embodiment of the present invention a system for providing continuous identity verification for access to a human operated machine is provided, the system comprising: one or more external biometric scanners capable of providing biometric data readings of a number of physiological and behavioral characteristics from a user continuously and simultaneously acquired in real-time, wherein the one or more external biometric scanners are grouped in a bank, one or more scan controllers controlling the one or more external biometric scanners to generate a separate digital biometric profile from each biometric data reading from a respective external biometric scanner; one or more input/output ports modules capable of enabling an external device to interface with the system to submit data or to accept output from the system; a scan bank manager capable of time-synchronizing operations and output of the one or more scan controllers and executing scanner control commands; a biometric database capable of storing user reference digital biometric profiles for the number of respective user physiological and behavioral characteristic obtained during a registration process; one or more probabilistic authentication processors each capable of executing user authentication based on a numerical calculation of the probability that a digital biometric profile generated from the biometric data reading of the number of physiological and behavioral characteristic of the user is equivalent to a user reference digital biometric profile retrieved from the biometric database; an authenticator bank controller capable of time-synchronizing operations and output of the one or more probabilistic authentication processors; one or more joint probability calculators each capable of accepting one or more time-synchronized statistically independent probability scores, computing a joint probability score and writing it into a memory store; one or more statistical smoothing calculators each capable of reading the one or more probability scores from the memory store, accepting an operational parameter and carrying out a computation and output of a statistical smoothing function (moving average, moving median, etc.) of the one or more probability scores based on a provided value of the operational parameter; wherein the memory store has a specified capacity capable of storing the one or more probability scores written by a joint probability calculator of the one or more joint probability calculators such that if the specified capacity is reached, a new entry replaces an earliest previous entry written to the memory store; an administrator function capable of configuring the system. a central control processor capable of supervising and managing the usage and operations of all system resources; and a clock which enables the central processing unit to time-synchronize all system operations.

In one embodiment, the system further comprises a policy database capable of storing policies, functions and parameters values that govern the operation of the system making them accessible to the scan bank manager, an authenticator bank manager of the system, the one or more joint probability calculators, the one or more statistical smoothing calculators and a comparator. In one embodiment, the comparator is a context-sensitive array comparator comprising one or more simple binary comparators and capable of accepting a finite set of tuples of type ($x_1$, $x_2$, context, action if $x_1$ and $x_2$ match in context, action if $x_1$ and $x_2$ do not match in context), each addressed to a specific binary comparator, and outputting a first multinary set comprising of actions that are authorized based on successful matches output by the binary comparators and a second multinary set comprising of actions that are authorized based on failed matches output by the binary comparators.

In another embodiment, the biometric database is physically distributed and is incorporated into an electronic device on an external data repository service or accessible over a network. In one embodiment, multiple instances of the biometric database exist to provide reliability and security. In yet another embodiment, the central control processor is physically distributed. In one embodiment, the system further comprises a location and proximity sensor capable of providing continuous location and proximity information from the user.

In one embodiment, the system further comprises a location scan controller for controlling the operation of the location and proximity sensor, wherein the location scan controller is capable of taking periodic sample location and proximity readings to determine user location and proximity. In another embodiment, the system further comprises a proximity probability simulator capable of generating a simulated probability score reflecting the level of likelihood that the user is within a given location and proximity.

In another aspect of the invention, a method is provided, comprising steps (a) reading a plurality of biometric attributes from a user continuously and simultaneously from one or more time-synchronized biometric scanners, wherein the plurality of biometric attributes includes a plurality of attribute samples from a plurality of scanner channels; (b) selecting one of the plurality of attribute samples from a channel of the plurality of scanner channels based on rules from a policy database; (c) generating a digital profile that can uniquely identity the user from the one of the plurality of attribute samples; (d) comparing the digital profile to a reference profile in a biometric database, wherein the biometric database was generated during a prior registration process; and (e) generating a probability value that the digital profile and the reference profile belong to the same user.

In one embodiment, a further step is provided, repeating the method from steps (b)-(e) to generate a plurality of digital profiles corresponding to a plurality of independent probabilities from each of the plurality of attribute samples. In one embodiment, a further step is provided, computing a single joint probability from the plurality of independent probabilities, wherein the single joint probability is used to determine that the plurality of digital profiles belong to the same user. In one embodiment, a further step is provided, computing a n-order moving average for the single joint probability based the current and the most recent n−1 joint probability values obtained from a memory storage from the plurality of independent probabilities based on rules from the policy database to determine that the plurality of digital profiles belong to the same user. In one embodiment, a further step is provided, computing a moving median probability for the joint probability based the current and the n−1 most recent joint probability values obtained from a memory storage from the plurality of independent probabilities based on rules from the policy database to determine that the plurality of digital profiles belong to the same user. In one embodiment, a further step is provided, comparing the n-order joint probability moving average from threshold values from the policy database to determine based on rules specific to logic for step up and step-down trust level to authenticate the user. In one embodiment, a further step is provided, comparing the joint moving median probability from threshold values from the policy database to determine based on rules specific to logic for step up and step-down trust level to authenticate the user.

In one embodiment, in step (d), the prior registration process includes repeating the method steps (a)-(c) to generate multiple digital profiles that uniquely identify the user, wherein the multiple digital profiles are indexed and stored in the biometric database. In one embodiment, in step (d), a context-sensitive comparator is used to compare the digital profile to the reference profile. In another embodiment, the context-sensitive array comparator comprises one or more simple binary comparators and capable of accepting a finite set of tuples of type ($x_1$, $x_2$, context, action if $x_1$ and $x_2$ match in context, action if $x_1$ and $x_2$ do not match in context), each addressed to a specific binary comparator, and outputting a first multinary set comprising of actions that are authorized based on successful matches output by the binary comparators and a second multinary set comprising of actions that are authorized based on failed matches output by the binary comparators.

BRIEF DESCRIPTION OF THE SEVERAL VIEWS OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments. Referring to the drawings in which like reference character(s) present corresponding part(s) throughout:

FIG. 2A is an example application a human operated machine not using the present invention.

FIG. 2B is an example application of a continuous biometric user authentication system according to an embodiment of the present invention.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Figure 1:
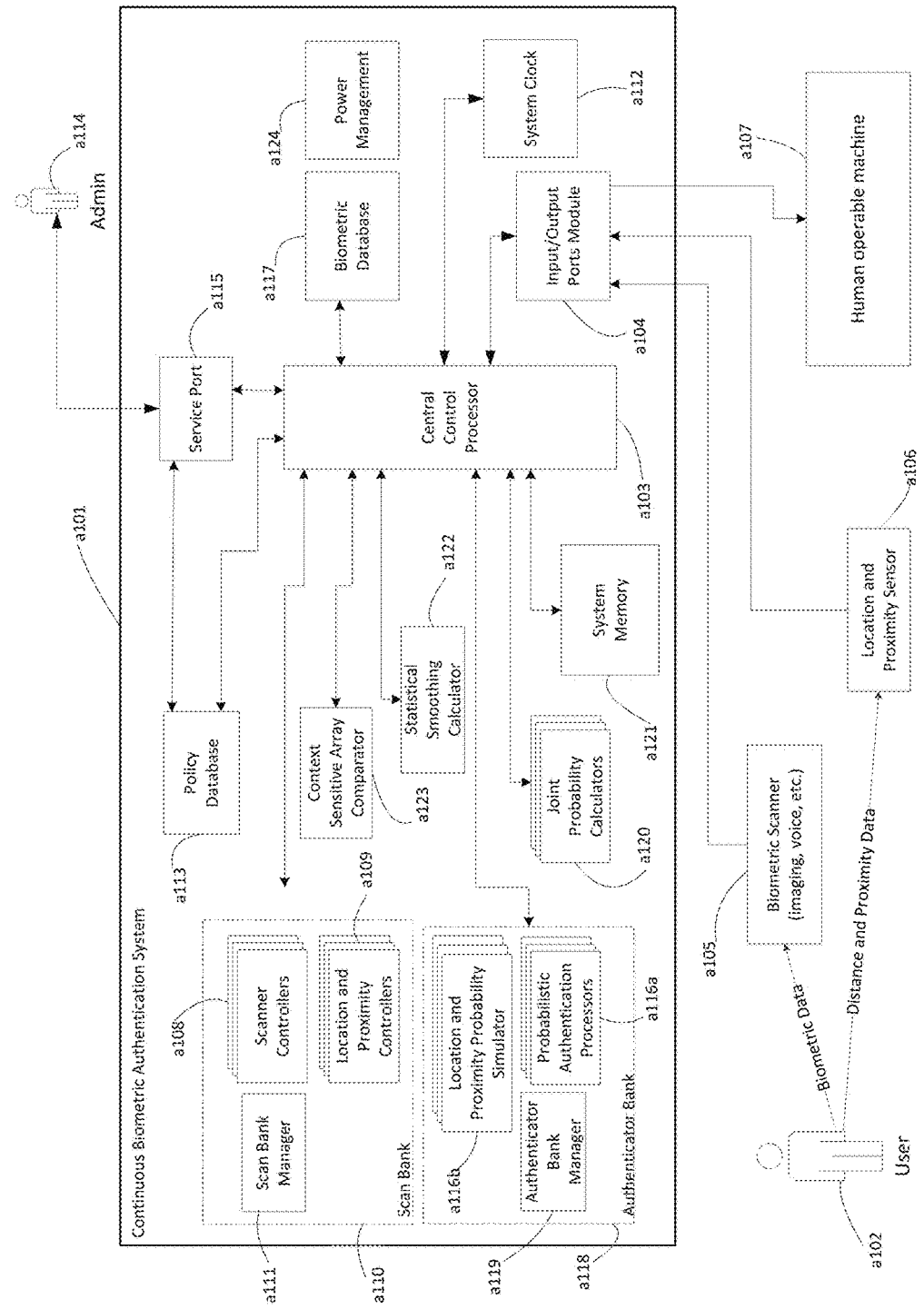
FIG. 1 is an example of a continuous biometric user authentication system according to an embodiment of the present invention.

FIG. 1 shows a block diagram illustrating functional components for a system a101 for providing continuous authentication according to one embodiment of the invention. Referring to FIG. 1, in one embodiment of the system for providing continuous authentication and graceful granting or denial of access to a user a102 to control a human operated machine a107 is illustrated. In one embodiment, central control processor a103 schedules, synchronizes and supervises operations of all other components of system a101. In one embodiment, input/output ports module a104 enables an external device a105 to interface with the system and submit biometric data or external device a106 to submit user location and presence data to the system. The external device a105 electronically captures user physiological and behavioral characteristics, including but not limited to fingerprint scanners, microphones, iris scanners, touch screens, cameras and keyboards. In one embodiment device a106 is a location and proximity sensor which captures user geolocation and proximity, and may utilize technologies such as global positioning system (GPS), electromagnetic radiation (EMR) enabled distance and proximity (of user a102 to device a106) sensing.

Still referring to FIG. 1, Input/output ports module a104 also enables a human operated machine a107 to interface with the system and accept output data from the system. In one embodiment, the human operated machine may include electronic devices, automotive and locomotive systems, craft, weaponry and other apparatuses that respond to electronic instructions.

In one embodiment, the input/output ports module a104, under the supervision of the central control processor, is capable of streaming the biometric inputs it accepts into the system to an appropriate scanner controller a108, which is able to periodically sample the biometric data stream and generate a digital biometric profile that uniquely belongs to and identifies the user a102.

In one embodiment, the input/output ports module accepts location and proximity inputs, which it continuously directs to an appropriate location and proximity controller a109, which in turn is able to periodically sample location and proximity data stream and generate a digital location and location profiles that tell the current location and proximity of user a102 to sensor a106.

In one embodiment, the input/output ports a104 module is capable of simultaneously streaming biometric inputs from one or more sources on user to the respectively appropriate scanner controllers. Biometric inputs may be any input including but not limited to fingerprint scans from each of the ten fingers, iris scan, gesture capture and voiceprint. In one embodiment, the input/output ports module is capable of simultaneously streaming location and proximity (of user a102 to sensor a106) data inputs from one or more sources to the respectively appropriate location and proximity controllers a109.

The central control processor is able to associate one or more scanner controllers and location and proximity controllers with a single logical scan bank a110, such that the operations of the scanner controllers and location and proximity controllers that are associated with such a scan bank can be collectively supervised and managed by the scan bank manager a111.

In one embodiment, the system requires and may incorporate a system clock a112 to provide a clock signal wherein all other components of the system may be able to synchronize. The scan bank manager, the scanner controllers, and the location and proximity controllers which the bank manager a111 supervises, all synchronize their operations to the system clock and corresponding clock signal. At least once per clock cycle of the system clock, the scan bank manager must be able schedule multiple scanner controllers and location and proximity controller under its supervision to simultaneously execute respective sample readings from the biometric and location and proximity data streams that each would be continuously receiving from the input/output ports module a104.

In one embodiment, the operational parameters, functions and policies that govern the functional behavior of the central control processor, the scan bank manager and other components of the system a101 are retrieved from the policy database a113.

In one embodiment, after scanner controller a108 takes a sample reading from a biometric data stream that it is continuously receiving from input/output ports module a104, it is able to generate a digital biometric profile that is uniquely associated with the user and output it to an appropriate probabilistic authentication processor al 116a at the same point in time as other scanner controllers a108 and location and proximity controller a109 in scan bank a110, under supervision of scan bank manager a111.

In one embodiment, scanner controller a108 is capable of capturing the context information $C_k$, which describes the source of the data biometric it reads with respect to the various parts on the human body, and write it under to a location in system memory a121, from where it can be subsequently retrieved.

In one embodiment, after the location and proximity controller a109 takes a sample reading from a location and proximity data stream that it is continuously receiving from input/output ports module a104, it is able to generate a location and proximity digital profile that tells the current location and proximity of user a102 to sensor a106 and output it to appropriate probabilistic authentication processor a116a at the same point in time as scanner controllers a108 in scan bank a1110, under supervision of scan bank manager a111.

In one embodiment, a biometric database a117 is provided, wherein each scanner controller a108 saves the biometric digital profiles it generates when the scan bank manager a111 is operating in registration mode.

In one embodiment, the scan bank manager may not have the capability to schedule in one cycle of the system clock the scanner controllers or the location and proximity controllers to execute sample readings from the biometric or location and proximity data streams that each would be continuously receiving from input/output ports module a104 until the scanner controllers and location and proximity controllers in the scan bank have synchronously output their respective biometric digital profiles to appropriate probabilistic authentication processors a116a and location and proximity profiles to appropriate location in system memory a121. The probabilistic authentication processor is capable of retrieving a biometric digital profile for the user from biometric database a117, where it was saved during registration and compare it to one that it inputs from scanner controllers a108 and computing a probability that the two profiles are uniquely associated with the same user. Likewise, the probabilistic authentication processor may also be programmed to accept a location and proximity digital profile and simulate a number representing the probability that the source of the biometric data is physically present at the location whose coordinates in space which was included in the location and proximity digital profile.

In one embodiment, the central control processor can logically associate one or more probabilistic authentication processors a116a with a single authenticator bank a118, such that operations of probabilistic authentication processors can be collectively supervised and managed by an authenticator bank manager a119.

Still referring to FIG. 1, in one embodiment, at least once per clock cycle of the system clock a112, the authenticator bank manager must be able to schedule the probabilistic authentication processors under its supervision to synchronously output the individual probability values that they respectively generate to a joint probability calculator a120. The joint probability calculator must be able to calculate a joint probability that the multiple streams of biometric data that flow into the system through input/output ports module all come from the same user as the one whose biometric digital profiles were saved into the biometric database during prior registration. Furthermore, the joint probability calculator must be able to write its results in a fixed size FIFO (First In First Out) circular queue data structure in system memory a121. The size of the queue N is an operational parameter that may be fixed in design or retrieved from the policy database a113.

Generally speaking a statistical smoothing function (moving average, moving median, exponential, etc.) filters volatility in time domain data, of which the biometric data that flows into the system a101 and the joint probability value generated by joint probability calculator a120 are good examples.

In one embodiment, a statistical smoothing calculator a122 is capable of retrieving the N most current joint probability values from the FIFO circular queue data structure in system memory a121, where they are saved and maintained by the joint probability calculator a120, to compute a moving statistic (moving average, moving median, etc.) joint probability of order N.

A context-sensitive array comparator a123 comprises one or more simple binary comparators and is capable of accepting a finite set of tuples of type ($x_1$, $x_2$, context, action if $x_1$ and $x_2$ match in context, action if $x_1$ and $x_2$ do not match in context), each addressed to a specific binary comparator, and outputting a first multinary set comprising of actions that are authorized based on successful matches output by the binary comparators and a second multinary set comprising of actions that are authorized based on failed matches output by the binary comparators. In one embodiment, the multi-step comparator must be able to transmit its output through the input/output ports module to human operated machine a107 indicating if the system has authenticated the user and at what level of confidence.

In one embodiment, the number of system clock cycles between outputs from the context-sensitive array comparator a123 comparator to the human operated machine may vary depending on processor technologies used in the design as well as the system clock speed.

A power management module a124 may be included in the system to manage the power requirements of the system. However, other embodiments of the present invention may rely on external power management alternatively.

FIG. 2A is a conceptual example of a continuous biometric authentication user interface to a human operated machine not using the present invention. Referring now to FIG. 2A, a train a107 is controlled via interface a201, the interface comprising a camera a202, a microphone a203, a display area a204, and a plurality of flat-surface biometric data scanners a105 associated with command controls. In one embodiment, the plurality of command controls specific scanners include start a205, stop a206, reverse a207, forward a208, a speed bar a209, and cruise area a212, which covers the remaining surface of user interface a201. The speed bar controls the speed of the train via a reduce speed button a210 and an increase speed button a211. In theory, the user interface system a201 would continuously authenticate an authorized user a102 (the driver) and enable them to securely control the train provided that his hands are clean, he keeps them on cruise area a212 or one of the command controls all the time. In practice, however, most human-operated high value military, commercial, government and private that could benefit from a stable environment, are operated in environments where extraneous factors like body movements, noise, dirt, water and such lead to frequent false negatives or false positives.

FIG. 2B is an example application of a continuous biometric user authentication system a101 according to an embodiment of the present invention. Referring now to FIG. 2B, a train a107 is controlled via a biometric interface a213, the biometric interface comprising a camera a202, a microphone a203, a display area a204, a left hand touchpad area a214 and a right hand touchpad area a215. The left hand touchpad area a214 is a collection of fingerprint and palm print scanners, including one dedicated to each individual finger on the left hand and non-dedicated areas that could be used to scan any left hand finger or the left palm-print or a combination thereof. The right hand touchpad area a215 is a collection of fingerprint and palm print scanners, including one dedicated to each individual finger on the right hand and non-dedicated areas that could be used to scan any right hand finger or the right palm-print or a combination thereof. The biometric interface a213 is linked to the train a107 by the continuous biometric user authentication system. In one embodiment, as a user is continuously authenticated, the user may operate the train via the biometric interface. In one embodiment, either or both left hand touchpad area a214 and/or right hand touchpad area a215 may be responsive to fingers placed on their respective dedicated scanner areas and/or non-dedicated areas as well as voice commands via the microphone and/or physical gestures via the camera. In one embodiment, the train may be commanded to do a specific task when combinations of specific fingers are placed on the command touchpad at the same time or in a specific sequence. For instance, the combination of a left thumb (LT) and a right index (RI) finger may communicate to the train to increase speed. It should be understood, that the operation of train a107 in FIG. 2, using the biometric interface a213 as described above, may vary and the example is intended to illustrate the potential for a new generation of simpler and highly secure biometric man-machine user interfaces based on the present invention. It should also be understood, that the train is just one application using the continuous biometric authentication, and other machines and/or vehicles may be utilized with the present invention.

Figure 3:
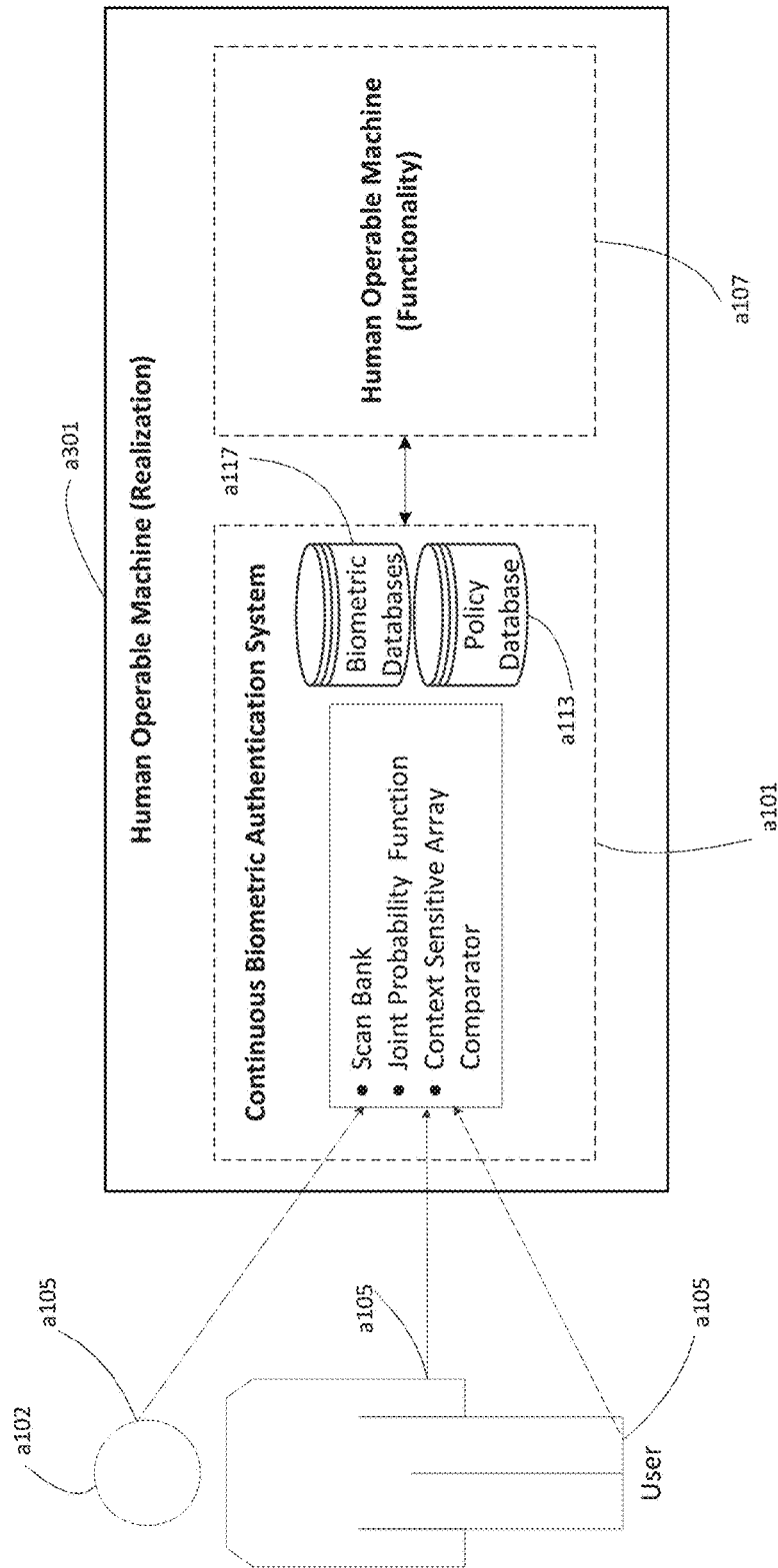
FIG. 3 is an example of a continuous biometric user authentication system according to an embodiment of the present invention.

FIG. 3 is an example of a continuous biometric user authentication system a101 according to an embodiment of the present invention, wherein the system is deployed as a fully embedded input/out interface component of a human operated machine a301 enabling a user a102 to control the intrinsic functional character a107 of the human operated machine. Referring now to FIG. 3, in one embodiment, a plurality of biometric attributes is collected from a user a102 continuously by one or more biometric scanners a105. The system operating as previously discussed. In this embodiment, it is a particular advantage of the present invention that the system a101 is fully embedded. For instance, the system may be embedded within a product or integrated within a vehicle to replace or instead of a traditional touch-button operator control panel. In alternative embodiments, the system may be deployed as a human operated machine user interface wherein the machine is remotely accessible over a communication network; this will be discussed in further detail below.

Figure 4:
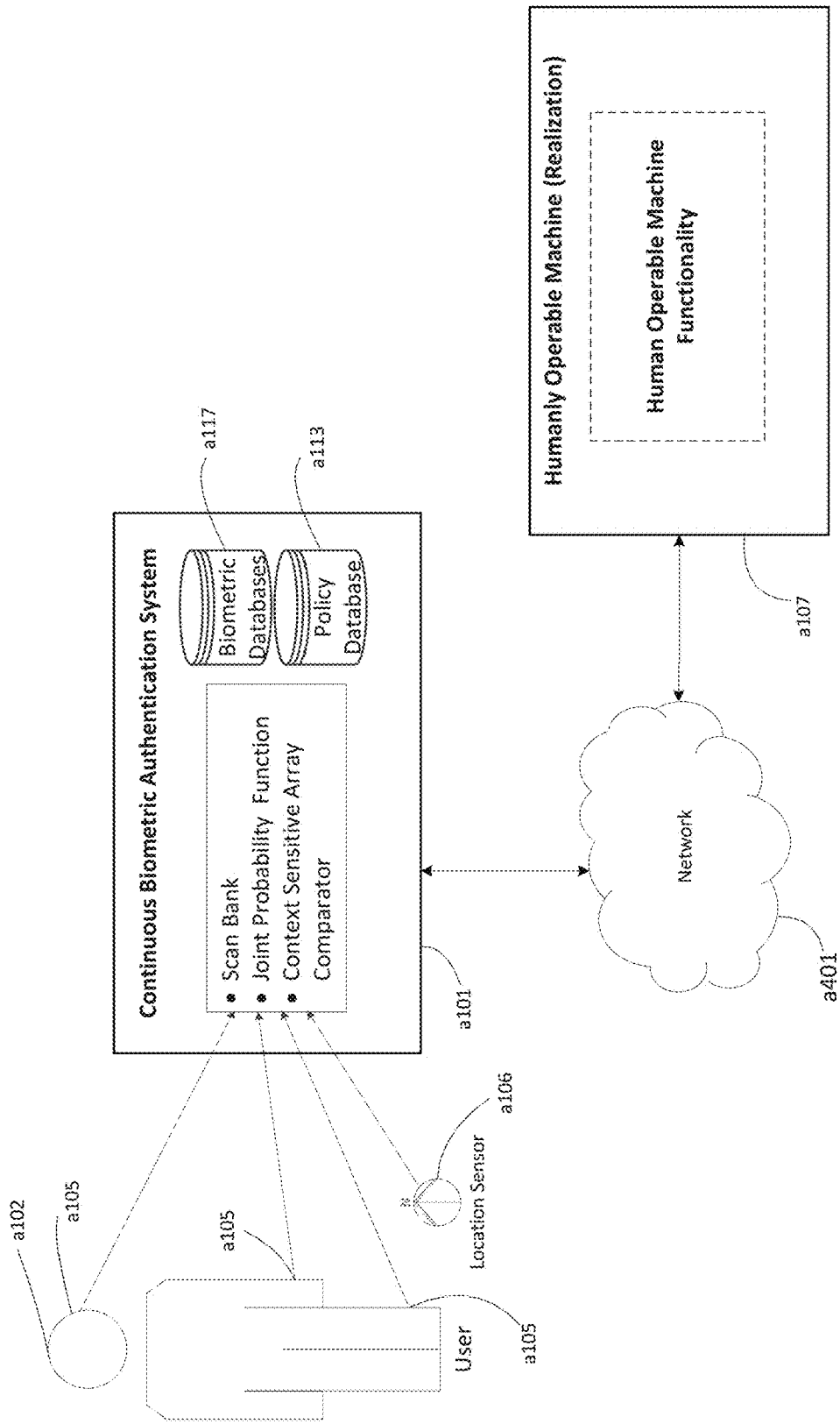
FIG. 4 is an example of a continuous biometric user authentication system according to an embodiment of the present invention.

FIG. 4 is an example of a continuous biometric user authentication system a101 according to an embodiment of the present invention wherein the system is deployed as a human operated machine a107 user interface wherein the machine is remotely accessible over a communication network a401. Referring now to FIG. 4, in one embodiment, a plurality of biometric attributes is collected from a user a102 continuously by one or more biometric scanners a105. As previously mentioned, unlike the system of FIG. 3, in this embodiment, the system enables users to remotely access and control the human operated machine over the communication network. In one embodiment, the system includes a location and proximity sensor a106 capable of providing continuous location and proximity information from the user. This a particular advantage of the present invention, when it is required to integrate continuous location and proximity information in the process of verifying user identity identification, in applications such as proof of presence or where the user may be mobile. For example, if the human operated machine is a drone, and the user's location was included in the criteria to control the drone, then the user must be in a specific location to control the drone.

Still referring to FIG. 4, in one embodiment, a plurality of biometric attributes is collected from a user a102 continuously by one or more biometric scanners a105. In this embodiment, the human operable machine could be part of a larger command and control system, whereby the system enables the user to communicate to command and control from remotely places via biometrics enabled security and message codification.

It must be understood, that FIGS. 3 and 4 describe opposite ends of a spectrum of physical deployment in space and situations existing between the two ends of the spectrum may be included without departing from the spirit and scope of the invention.

Figure 5:
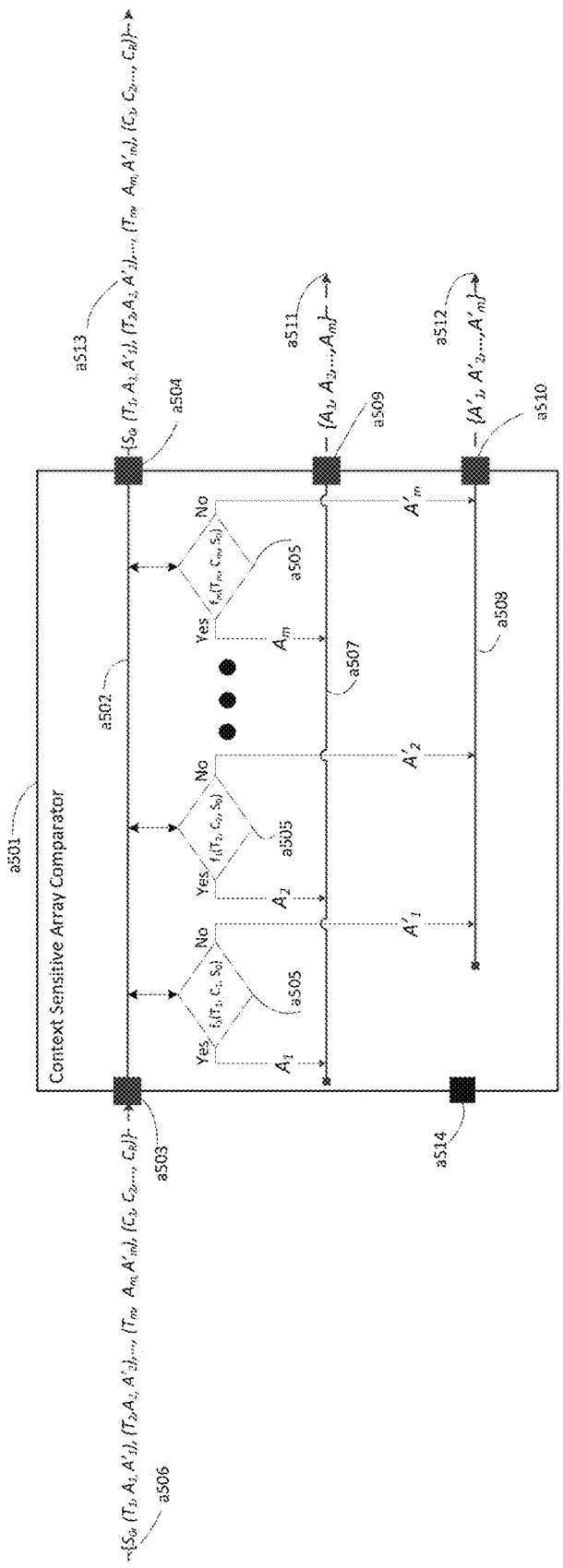
FIG. 5 shows the basic organization of a context sensitive array comparator according to an embodiment of the present invention.

FIG. 5 illustrates basic components and organization of a context sensitive array comparator a501 (a123) according to an embodiment of the present invention. Referring now to FIG. 5, a first serial bus a502 is terminated by an input port a503 and an output port a504, and can interconnect an array of two or more addressable and time-synchronized simple comparators a505, wherein each simple comparator a505 with address (k≥1) can: (a) synchronously read from input a506 the values $T_k$, $C_k$, $A_k$, $A'_k$, and $S_0$ from the first serial bus; (b) apply binary comparator function $f_k(T_k, C_k, S_0)$ to the read values, which generates either a positive or a negative output; (c) and write $A_k$ to a second serial bus a507 if output from $f_k(T_k, C_k, S_0)$, is positive or $A'_k$ or to a third serial bus a508 if the output from $f_k(T_k, C_k, S_0)$ is negative. It should be understood, that each simple comparator of the array of two or more addressable and time-synchronized simple comparators may be unique, the same, or a combination thereof.

Yet still referring to FIG. 5, second bus a507 terminates into a second output port a509, which synchronously outputs the action identifiers of type $A_k$. Third bus a508 terminates into a third output port a510, which synchronously outputs the counter-action identifiers of type $A'_k$. In one embodiment, output port a504 has the capability to output all or part of input a506 (a513), received by input port a503 at the beginning of each execution cycle, in synchrony with the second and third output port at the end of each execution cycle.

In one embodiment, the context sensitive array comparator includes a mechanism a514 to accept an external clock signal for purposes of synchronizing the operations in its execution cycle.

In one embodiment, element $S_0$ in input a506 is a numerical value, such as a probability score, wherein $C_k$ describes context where the data in biometric data stream k was collected from the user, for example a right thumb. In one embodiment, $T_k$ is threshold value that simple comparator a505 uses to compare with $S_0$ in the function $f_k(T_k, C_k, S_0)$ and both $A_k$ and $A'_k$ are unique identifiers of operational commands that a machine can respectively ingest, through the second and third output ports a509 and a510 respectively, and respond to, possibly, while referring to all or part of raw data string a513 that is output through port a504. In one embodiment, a513 may be a subset or superset of a506.

Figure 6:
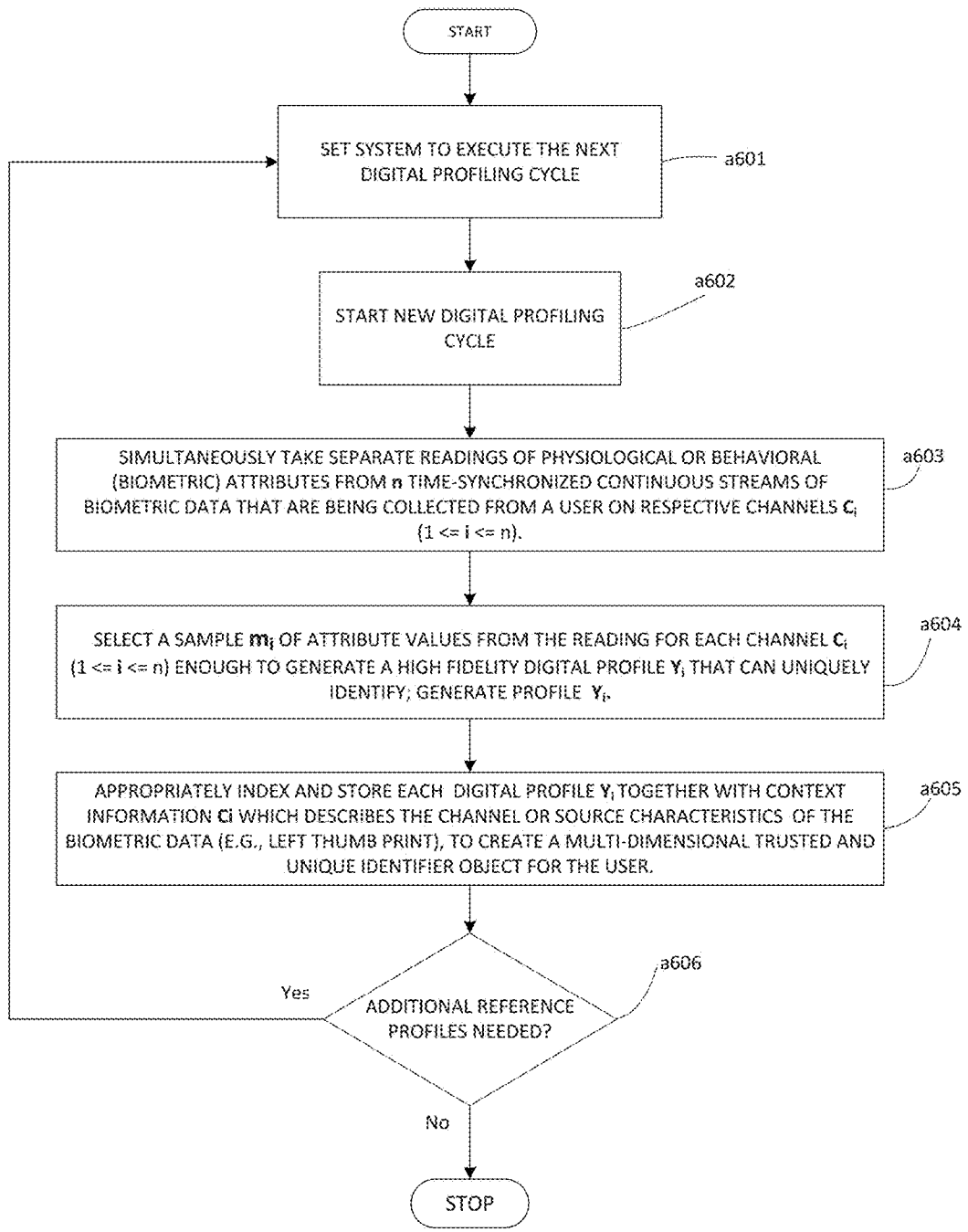
FIG. 6 shows the main steps associated with registration of users for a biometric authentication system according to an embodiment of the present invention.

FIG. 6 shows the main steps associated with registration of users for a biometric authentication system according to an embodiment of the present invention. It is critical to note, that a user a102 must be registered before the system can successfully authenticate the user. The registration steps include: step a601 setting the system to execute the next digital biometric profile generation cycle; step a602 initiating a new digital biometric profile generation cycle; step a603 taking separate sample readings from one or more time synchronized biometric data inputs; step a604 generating digital biometric profiles that uniquely identify the user based on each respective biometric data source; step a605 indexing and saving the digital biometric profiles together with matching biometric data source context information into biometric database a117 (FIG. 1); step a606 verifying if there is a need for additional digital biometric profiles to be generated and saved; and returning to step a602 if there is a need for additional digital biometric profiles to be generated and saved a606 or stopping the process, if there no such need need.

Figure 7:
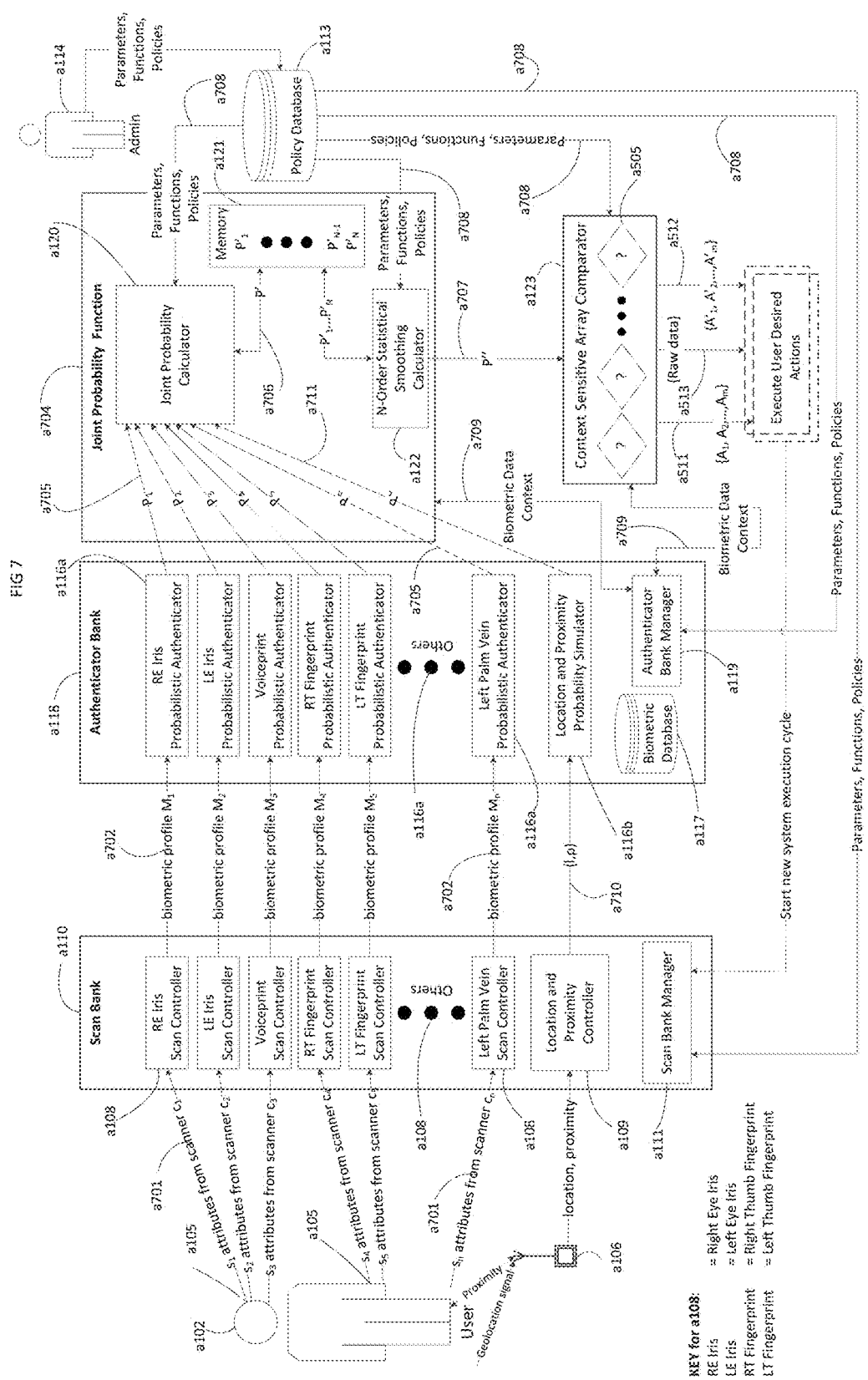
FIG. 7 is a block diagram illustrating the main data and control flows in the method used to verify user identities for continuous biometric authentication and associated biometric data sources, on the human body, with action commands that can be output to a human operated machine to express user intent according to an embodiment of the present invention.

FIG. 7 is a block diagram illustrating the main data and control flows in the method used to verify user identities for continuous biometric authentication and associated biometric data source contexts with actions that can be output to a human operated machine according to an embodiment of the present invention. Referring now to FIG. 7, a user a102 outputs biometric attributes to n (n≥1) scanner devices a105, wherein each scanner device is associated with a biometrics input herein, channel a701. Each biometric data input channel a701 is controlled by a scanner controller a108. At set time intervals, each scanner controller a108 for input channel i (1≤i≤n) reads a sample that includes $m_i$ attributes from a continuous feed of biometric attributes $s_i$ (1≤i≤n) that may be used to uniquely identify the user. For example, minutiae in a fingerprint scanning or acoustic marker in voice scanning.

In one embodiment, a scan bank manager a111 synchronizes the n scanner controllers a108 to read a sample from their individually dedicated biometric data streams at exactly the same point in time, generate respective digital biometric profiles from the biometric data samples and output biometric profiles a702 at exactly the same point in time.

In one embodiment, each digital biometric profile $m_i$ (a702) that is output by a scan controller a108 for channel i (1≤i≤n), is output to an appropriate probabilistic authenticator a116a. The probabilistic authenticator uses the most appropriate technology to authenticate the digital biometric profile $m_i$(a702) against one or more profiles $Y_x$ (x≥1) for the user that are already registered in biometric databases a117. The output of the probabilistic authenticator for channel i is (0≤Pi≤1) a705 is the probability that the user is the same person as the person whose profiles are retrieved from the biometric databases.

In one embodiment, an authenticator bank manager a119 synchronizes the n probabilistic authenticators a116a to ingest the outputs from their individually dedicated channel specific scanner controllers a108 at exactly the same point in time and output their respective probability scores a705 at exactly the same point in time. The set of n probability scores Pi a705 that are generated by the time synchronized probabilistic authenticators a116a is ingested by a joint probability calculator a120, which computes a joint probability P' (a706) that the user is the source of the biometric streams a701 that were acquired by the scanners a105 on all the n input channels and authenticated by probabilistic applicable authenticators a116a.

In one embodiment, the n authentication probability scores Pi ($0 \leq i \leq 1$) a705 are assumed to result from statistically independent events so that their joint probability has a formula: $P'=(P_1 \times P_2 \times \ldots \times P_n)$ a706. In alternative embodiments, of the system may make alternative assumptions about the independence of the Pi values a705. In the environment where the multiple biometric data streams are collected from the user is stable, the joint probability P' (a706) could be effective for continuously verifying the identity of the user based on a specified threshold $H_0$. However, because traditional authentication systems are inherently binary and memoryless, and biometric data acquisition environment are often unstable (e.g., momentary body movements, dirty hands, noisy surroundings, changing light conditions, etc.), the variability in the value of P' a706 and the risk of frequent false positives and false negatives, makes it unsuitable for use in commercial, military, and other user interfaces for human operated machines. To mitigate the risk of frequent false positives and false negatives due to organic volatility in the value of value P' a706 the present invention incorporates memory, making it retentive, and uses statistical smoothing window methods, including but not limited to a moving average, weighted moving average, moving median, and exponential smoothing, to stabilize P' values. In one embodiment, moving average smoothing is used as shown in FIG. 7.

An N-order statistical smoothing calculator a122 computes a new moving statistic (moving average, moving median, etc.) P''' (a707) for the current execution cycle from the N values in the FIFO data structure in memory a121, which include the P' value a706 for the current system execution cycle.

In one embodiment, new moving statistic P''' (a707) is fed synchronously into context sensitive array comparator a501 with parameters, functions and policies from policy database a113 and biometric data context information a709 (retrieved from memory a121 where it would have been stored by scanner controllers a108), wherein the context sensitive array comparator generates and outputs three streams of data to end a system execution cycle of the method of one embodiment of the present invention: (a) a511 set of actions of type $A_k$ for which the user was authenticated using their biometric profile for data stream k; (b) set a512 of actions of type $A'_k$, for which the user could not be authenticated using their biometric profile for data stream k; and (c) all or a subset a513 of the data that the context sensitive array comparator used or produced in connection with one execution cycle of the system.

In one embodiment, the use of a location and proximity controller a109 and a location and proximity probability simulator a116b are incorporated in the method of the present invention to integrate continuous location and proximity information in the process of verifying user identity identification, in applications such as proof of presence or where the user may be mobile. When continuous location and proximity information is integrated in the process of verifying user identity, the location and proximity controller is synchronized with the scan controllers and reads samples of location and proximity information (l, p) 710 from the location and proximity sensor at exactly the same time as all scan controllers a108.

In one embodiment, location and proximity controller a109 outputs the location and proximity information to location and proximity probability simulator a116b, which generates a simulated probability score $P_c$ (a711) that is in the same value range as the probabilities Pi generated by probabilistic authenticators a116a.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

In addition, reference to "first," "second," "third," and etc. members throughout the disclosure (and in particular, claims) are not used to show a serial or numerical limitation but instead are used to distinguish or identify the various members of the group.

What is claimed is:

1. A system for providing continuous identity verification for access to a human operated machine comprising:
one or more external hardware biometric scanners configured to provide biometric data readings of a number of physiological and behavioral characteristics from a user continuously and simultaneously acquired in real-time, one or more scan controllers reading sample of the data provided by the one or more external scanners, wherein the one or more scanner controllers are grouped in a bank, one or more scan bank managers controlling the one or more scan controllers to generate a separate digital biometric profile from each biometric data sample reading from a respective external biometric scanner;
one or more input/output ports modules configured to enable an external device to interface with the system to submit data or to accept output from the system;
a scan bank manager configured to execute time-synchronizing operations and output of the one or more scan controllers and execute scanner control commands;
a biometric database configured to store user reference digital biometric profiles for the number of respective user physiological and behavioral characteristic obtained during a registration process;
one or more probabilistic authentication processors each configured to execute user authentication based on a numerical calculation of the probability that a digital biometric profile generated from the biometric data reading of the number of physiological and behavioral characteristic of the user is equivalent to a user reference digital biometric profile retrieved from the biometric database;

an authenticator bank controller configured to execute time-synchronizing operations and output of the one or more probabilistic authentication processors;

a memory store;

one or more joint probability calculators each configured to accept one or more time synchronized statistically independent probability scores, computing a joint probability score and writing it into the memory store;

one or more statistical smoothing calculators each configured to read the one or more probability scores from the memory store, accept an operational parameter and carry out a computation and output of a moving statistic, such as moving mean or moving median or exponential smoothing value of the probability scores based on the provided operational parameter;

wherein the memory store has a specified capacity configured to store the one or more probability scores written by the one or more joint probability calculators such that if the specified capacity is reached, a new entry replaces an earliest previous entry written to the memory store;

an administrator function configured to configure the system;

a central control processor configured to supervise and manage the usage and operations of all system resources; and a clock which enables the central processing unit to time-synchronize all system operations.

2. The system of claim 1, further comprising a policy database configured to store functions, policies and parameters values that govern the operation of the system making them accessible to the scan bank manager, an authenticator bank manager of the system, the one or more joint probability calculators, the one or more statistical smoothing calculators and a comparator.

3. The system of claim 2, wherein the comparator is a context-sensitive array comparator comprising one or more simple binary comparators and configured to accept a finite set of tuples of type{x1, x2, context, action if x1 and x2 match in context, action if x1 and x2 do not match in context}, each addressed to a specific binary comparator, and output a first multinary set comprising of actions that are authorized based on successful matches output by the binary comparators and a second multinary set comprising of actions that are authorized based on failed matches output by the binary comparators.

4. The system of claim 1, wherein the biometric database is physically distributed and is incorporated into an electronic device on an external data repository service or accessible over a network.

5. The system of claim 4, wherein multiple instances of the biometric database exist to provide reliability and security.

6. The system of claim 1, wherein the central control processor is physically distributed.

7. The system of claim 1, further comprising a location and proximity sensor configured to provide continuous location and proximity information from the user.

8. The system of claim 7, further comprising a location scan controller for controlling the operation of the location and proximity sensor, wherein the location scan controller is configured to take periodic sample location and proximity readings to determine user location and proximity to the location and proximity sensor.

9. The system of claim 8, further comprising a proximity probability simulator configured to generate a simulated probability score reflecting the level of likelihood that the user is at a given location and within a given proximity of the location and proximity sensor.

* * * * *